US008332844B1

(12) United States Patent
Kulkarni et al.

(10) Patent No.: US 8,332,844 B1
(45) Date of Patent: Dec. 11, 2012

(54) ROOT IMAGE CACHING AND INDEXING FOR BLOCK-LEVEL DISTRIBUTED APPLICATION MANAGEMENT

(75) Inventors: Pradip Kulkarni, Pune (IN); Mukul Kumar, Pune (IN); Adhir Potdar, Pune (IN); Richard Au, Woodside, CA (US); Tung Nguyen, Cupertino, CA (US)

(73) Assignee: Emendable Assets Limited Liability Company, Wilmington, DE (US)

( * ) Notice: Subject to any disclaimer, the term of this patent is extended or adjusted under 35 U.S.C. 154(b) by 1193 days.

(21) Appl. No.: 11/709,477

(22) Filed: Feb. 21, 2007

Related U.S. Application Data (63) Continuation-in-part of application No. 11/395,816, filed on Mar. 30, 2006, now Pat. No. 7,721,282, which is a continuation-in-part of application No. 11/026,622, filed on Dec. 30, 2004, now abandoned.

(51) Int. Cl.
*G06F 9/445* (2006.01)
(52) U.S. Cl. .................................................... 717/176
(58) Field of Classification Search ................. 345/557; 717/176
See application file for complete search history.

(56) References Cited

U.S. PATENT DOCUMENTS

| | | | |
|---|---|---|---|
| 5,113,523 A | 5/1992 | Colley | |
| 5,127,104 A | 6/1992 | Dennis | |
| 5,175,852 A | 12/1992 | Johnson et al. | |
| 5,764,902 A | 6/1998 | Rothrock | |
| 5,974,547 A | 10/1999 | Klimenko | |
| 5,999,734 A | 12/1999 | Willis | |
| 6,018,747 A | 1/2000 | Burns | |
| 6,101,576 A * | 8/2000 | Kobayashi et al. | 711/122 |
| 6,195,680 B1 | 2/2001 | Goldszmidt | |
| 6,292,941 B1 | 9/2001 | Jollands | |
| 6,421,777 B1 * | 7/2002 | Pierre-Louis et al. | 713/2 |
| 6,442,605 B1 | 8/2002 | Rodriguez | |
| 6,502,238 B1 | 12/2002 | Pavan et al. | |
| 6,597,956 B1 | 7/2003 | Aziz | |
| 6,606,744 B1 | 8/2003 | Mikurak | |
| 6,745,192 B1 | 6/2004 | Libenzi | |
| 6,751,658 B1 * | 6/2004 | Haun et al. | 709/222 |
| 6,779,177 B1 | 8/2004 | Bahrs | |
| 6,871,219 B2 | 3/2005 | Noordergraaf | |
| 6,938,057 B2 | 8/2005 | Gusler | |
| 6,986,005 B2 | 1/2006 | Vo | |
| 6,990,513 B2 | 1/2006 | Belfiore | |

(Continued)

OTHER PUBLICATIONS

Calzarossa, M., and M. Kubát, "Processor Allocation in Parallel Systems," Proceedings of the IEEE International Conference on Computer Systems and Software Engineering (COMPEURO '91), Bologna, Italy, May 13-16, 1991, pp. 133-137.

(Continued)

*Primary Examiner* — Edward Martello
(74) *Attorney, Agent, or Firm* — Christensen O'Connor Johnson Kindness PLLC (57) ABSTRACT

Described herein is technology for, among other things root image caching and indexing for block-level distributed application management. The technology involves storing blocks of a root image on a first storage unit and storing blocks of leaf images on respective second storage units. The leaf images include additional data blocks not previously contained in the root image and changes made by respective compute nodes to the blocks of the root image. The technology includes caching blocks of the root image that have been accessed by at least one compute node. The technology also includes receiving indexing results pertaining to the root image from one compute node and providing the results for other compute nodes.

27 Claims, 6 Drawing Sheets

U.S. PATENT DOCUMENTS

| | | | |
|---|---|---|---|
| 6,990,573 B2 | 1/2006 | Cherian | |
| 7,127,712 B1 | 10/2006 | Noble | |
| 7,150,015 B2 | 12/2006 | Pace | |
| 7,155,714 B2 | 12/2006 | Makris | |
| 7,200,715 B2 | 4/2007 | Kleiman | |
| 7,246,221 B1 | 7/2007 | Soltis | |
| 7,246,351 B2 | 7/2007 | Bloch | |
| 7,263,551 B2 | 8/2007 | Belfiore | |
| 7,269,664 B2 | 9/2007 | Hutsch et al. | |
| 7,290,258 B2 | 10/2007 | Steeb | |
| 7,331,047 B2 | 2/2008 | Chu | |
| 7,334,157 B1 | 2/2008 | Graf | |
| 7,430,610 B2 | 9/2008 | Pace | |
| 7,454,462 B2 | 11/2008 | Belfiore | |
| 7,467,293 B2 | 12/2008 | Zhang | |
| 7,475,274 B2 | 1/2009 | Davidson | |
| 7,496,739 B1 | 2/2009 | Raghavan | |
| 7,499,988 B2 | 3/2009 | Keohane | |
| 7,536,686 B2 | 5/2009 | Tan | |
| 7,549,055 B2 | 6/2009 | Zimmer | |
| 7,590,653 B2 | 9/2009 | Sparks | |
| 7,668,938 B1 | 2/2010 | Phillips | |
| 7,685,148 B2 | 3/2010 | Engquist | |
| 7,870,106 B1 * | 1/2011 | Nguyen et al. | 707/694 |
| 2002/0016891 A1 | 2/2002 | Noel | |
| 2002/0083120 A1 | 6/2002 | Soltis | |
| 2002/0087813 A1 | 7/2002 | Harris | |
| 2002/0087846 A1 | 7/2002 | Nickolls | |
| 2003/0046511 A1 | 3/2003 | Buch | |
| 2003/0126242 A1 * | 7/2003 | Chang | 709/222 |
| 2003/0130832 A1 | 7/2003 | Schulter | |
| 2003/0233648 A1 | 12/2003 | Earl | |
| 2004/0015899 A1 | 1/2004 | May | |
| 2004/0078779 A1 | 4/2004 | Dutt | |
| 2004/0088473 A1 | 5/2004 | Ogle | |
| 2004/0199919 A1 | 10/2004 | Tovinkere | |
| 2005/0128319 A1 | 6/2005 | Morino | |
| 2005/0131962 A1 | 6/2005 | Deshpande | |
| 2006/0173993 A1 | 8/2006 | Henseler | |
| 2008/0229040 A1 | 9/2008 | Honma | |

OTHER PUBLICATIONS

Chen, D., et al., "Exploiting High-Level Coherence Information to Optimize Distributed Shared State," Proceedings of the 9th ACM Symposium on Principles and Practice of Parallel Programming, San Diego, Jun. 11-13, 2003, pp. 131-142.

Cohen, A., and M. Woodring, "Win32 Multithreaded Programming," O'Reilly Online Catalog, Chapter 1, <http://www.oreilly.com/catalog/multithread/excerpt/ch01.html> [retrieved Nov. 21, 2006], pp. 1-8.

Couturier, R., et al., "A Compiler for Parallel Unity Programs Using OpenMp," Proceedings of the International Conference on Parallel and Distributed Processing Techniques and Applications, Las Vegas, Nevada, Jun. 28-Jul. 1, 1999, pp. 1992-1998.

Ismail, I.M., and J.A. Davis, "Program-Based Static Allocation Policies for Highly Parallel Computers," Proceedings of the 1995 IEEE Fourteenth Annual International Phoenix Conference on Computers and Communications, Scottsdale, Arizona, Mar. 28-31,1995, pp. 61-68.

Kandemir, M., et al., "Minimizing Data and Synchronization Costs in One-Way Communication," IEEE Transactions on Parallel and Distributed Systems 11(12):1232-1251, Dec. 2000.

Li, K.-C., et al., "Design Issue of a Novel Toolkit for Parallel Application Performance Monitoring and Analysis in Cluster and Grid Environments," Proceedings of the 8th International Symposium on Parallel Architectures, Algorithms and Networks (ISPAN'05), Las Vegas, Nev., Dec. 7-9, 2005, 6 pages.

Nguyen, T.M., et al., "Branching Store File System," U.S. Appl. No. 11/026,622, filed Dec. 30, 2004.

Ohta, K., et al., "Improving Parallel Write by Node Level Request Scheduling," Proceedings of the 9th IEEE/ACM International Symposium on Cluster Computing and the Grid, Shanghai, May 18-21, 2009, pp. 196-203.

OpenMP Fortran Application Program Interface (Version 2.0), Nov. 2000, <http://www.openmp.org/drupal/mp-documents/fspec20.pdf>, pp. 1-3 and 34-36.

OpenMP Fortran Application Program Interface (Version 2.0), Nov. 2000, <http://www.openmp.org/drupal/mp-documents/fspec20.pdf>, pp. 1-3, 18-19, 25-27, 34-37, and 67.

"Sequent's NUMA-Q SMP™ Architecture," Sequent Computer Systems, Inc., 1997, <http://parallel.ru/ftp/computers/sequent/NUMA_SMP_REV.pdf>, pp. 1-18.

Sivathanu, G., et al., "Ensuring Data Integrity in Storage: Techniques and Applications," Proceedings of the 2005 ACM Workshop on Storage Security and Survivability (StorageSS '05), Alexandria, Va., Nov. 7-10, 2005, pp. 26-36.

Zhu, T., et al., "Scheduling Divisible Loads in the Dynamic Heterogeneous Grid Environment," Proceedings of the First International Conference on Scalable Information Systems, Hong Kong, May 29-Jun. 1, 2006, 10 pages.

* cited by examiner

ROOT IMAGE CACHING AND INDEXING FOR BLOCK-LEVEL DISTRIBUTED APPLICATION MANAGEMENT

CLAIM OF PRIORITY UNDER 35 U.S.C. §120

The present application for patent is a continuation-in-part of application Ser. No. 11/395,816, entitled "BLOCK-LEVEL I/O SUBSYSTEM FOR DISTRIBUTED APPLICATION ENVIRONMENT MANAGEMENT," filed Mar. 30, 2006, now U.S. Pat. No. 7,721,282, assigned to the assignee hereof and hereby expressly incorporated by reference herein.

REFERENCE TO CO-PENDING APPLICATIONS FOR PATENT

The present application for patent is related to the following U.S. patent application:

"VIRUS SCANNING FOR BLOCK-LEVEL DISTRIBUTED APPLICATION MANAGEMENT," by Kulkarni et al., filed Feb. 28, 2007, now U.S. Pat. No. 8,065,737, assigned to the assignee hereof and expressly incorporated by reference herein.

BACKGROUND

Background

Over the years, as the internet has expanded and computers have multiplied, the need for clustered computing such as High Performance Computing (HPC) has increased. Clustered computing involves multiple compute nodes, usually a server grid, that work together to achieve a common task. For example, several (typically hundreds of) compute nodes may be clustered together to share the load of serving a high-traffic website. In large-scale systems such as this, a trend in software deployment is to centralize data management on a globally accessible file system with stateless computing nodes. A common example of this is Operating System (OS) software image management, where the compute nodes are activated with the distributed application environment by either diskless booting protocols or remote software installation to local storage. Under this architecture, a boot image is required for each compute node in the cluster. The boot image necessarily contains the kernel; it may additionally contain the application software that is intended to be run on the compute node.

The primary concern in clustered computing is low cluster bring-up time. The software that provides the boot images for the cluster typically stores a master boot image. It may then either pre-create clones of this master image for each such server, or it may create them "on the fly."

Creating a boot image on the fly involves copying the entire contents of the master image, which are typically in the range of 5-15 GB. Even with a significant amount of bandwidth by today's standards, this method will result in a large bring-up time.

Pre-creating a boot image for each server is advantageous from the point of view of cluster bring-up time. However, since one often does not know in advance how many servers will ever be booted, this scheme may result in wasted disk space.

Regardless of which of the preceding methods is used, both suffer from the same major problem—updating the boot image(s) for the cluster is cumbersome, as it means updating a number of copies of the boot image.

Additionally, once some compute nodes have booted, they will often engage in redundant activities with respect to each other. For example, assume that a cluster involves 20 compute nodes each running the same operating system and using substantially similar hardware. The 20 compute nodes will generally need to access much of the same data (e.g., drivers, library files, etc.). Moreover, when each of the 20 compute nodes index their file systems, the index results will only vary slightly to the extent that each compute node has developed its own "personality." Thus, to the extent that there is redundancy in the operations of the compute nodes, CPU resources, disk space, and data bus bandwidth are wasted.

In a branching store file system, a read-only base image (or "root" image) of the application environment is created. The root image is accessible by all compute nodes in the cluster. Changes made by a compute node to the root image are stored in a "leaf" image unique to that compute node. A filter operates between the compute nodes and the file system(s), which merges the changes recorded on the leaf images with the root image and delivers the result to the appropriate compute node. From the point of view of the compute node, it is running its own unique and cohesive instance of the application environment. While this system allows for creation of boot images on the fly without severely diminishing bring-up time, a separate version of the system must be created for each unique operating system because data is stored at the file system level (i.e., on a "per file basis"). Thus, migrating a computing cluster from one operating system to another is much more complicated than simply installing a new root image containing the new OS.

SUMMARY

Described herein is technology for, among other things root image caching and indexing for block-level distributed application management. The technology involves storing blocks of a root image on a first storage unit and storing blocks of leaf images on respective second storage units. The leaf images include additional data blocks not previously contained in the root image and changes made by respective compute nodes to the blocks of the root image. The technology includes caching blocks of the root image that have been accessed by at least one compute node. The technology also includes receiving indexing results pertaining to the root image from one compute node and providing the results for other compute nodes.

Thus, embodiments of the present disclosure provide an operating system-independent system and method for distributing an application environment to a compute node. By utilizing a root-leaf system of application environment storage, embodiments of the present disclosure allow creation of boot images on the fly without significantly diminishing bring-up time. This is due to the fact that creating a new boot image does not require copying the contents of the root image. Rather it involves registering a new UBD with the system, which occurs very quickly. Bring up time, and access time in general, can be further improved by caching commonly accessed the portions of the root image. Moreover, updating the boot image for the entire cluster simply involves updating the root image. Additionally, because of the commonality of the root image and the fact that its contents are not directly changed, certain operations performed on the root image (e.g., indexing) only need to be performed once by one compute node. Thereafter, the results of that operation can be shared with the other compute nodes in the cluster, thus saving the other compute nodes valuable time and resources.

DETAILED DESCRIPTION

Reference will now be made in detail to various embodiments of the disclosure, examples of which are illustrated in the accompanying drawings. While the disclosure will be described in conjunction with the various embodiments, it will be understood that they are not intended to limit the scope of the claims to these embodiments. On the contrary, the disclosure is intended to cover alternatives, modifications and equivalents, which may be included within the spirit and scope of the disclosure as defined by the claims. Furthermore, in the detailed description of the present disclosure, numerous specific details are set forth in order to provide a thorough understanding of the present disclosure. However, it will be obvious to one of ordinary skill in the art that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or Magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present disclosure.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Briefly stated, described herein is technology for, among other things root image caching and indexing for block-level distributed application management. The technology involves storing blocks of a root image on a first storage unit and storing blocks of leaf images on respective second storage units. The leaf images include additional data blocks not previously contained in the root image and changes made by respective compute nodes to the blocks of the root image. The technology includes caching blocks of the root image that have been accessed by at least one compute node. The technology also includes receiving indexing results pertaining to the root image from one compute node and providing the results for other compute nodes.

Example Compute Node Operating Environment

Figure 1:
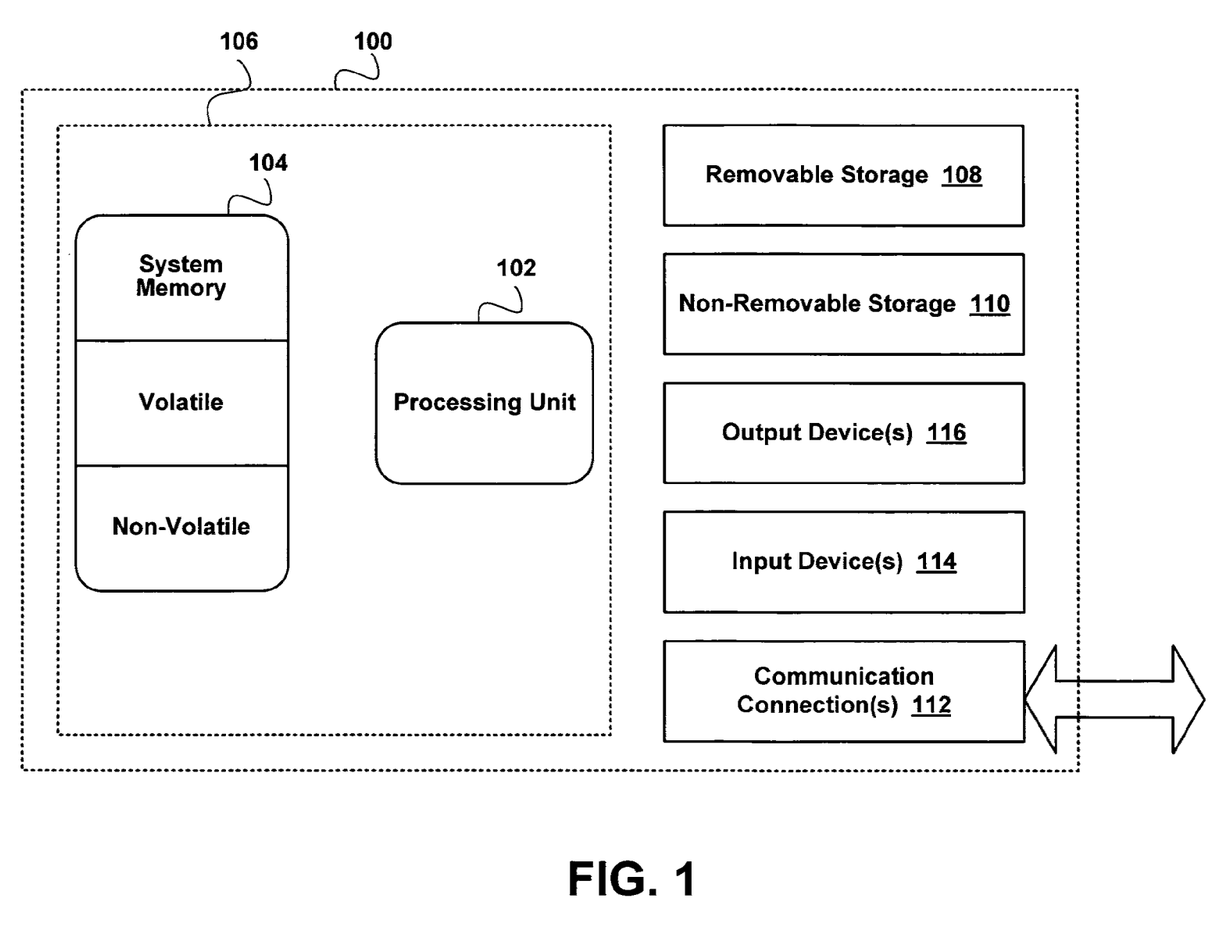
FIG. 1 is a diagram of a suitable system on which embodiments may be implemented.

With reference to FIG. 1, an example system for implementing embodiments includes a general purpose computing system environment, such as compute node 100. In its most basic configuration, compute node 100 typically includes at least one processing unit 102 and memory 104. Depending on the exact configuration and type of compute node, memory 104 may be volatile (such as RAM), non-volatile (such as ROM, flash memory, etc.) or some combination of the two. This most basic configuration is illustrated in FIG. 1 by dashed line 106. Additionally, compute node 100 may also have additional features/functionality. For example, compute node 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by compute node 100. Any such computer storage media may be part of compute node 100.

Compute node 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Compute node 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Example Systems

Figure 2:
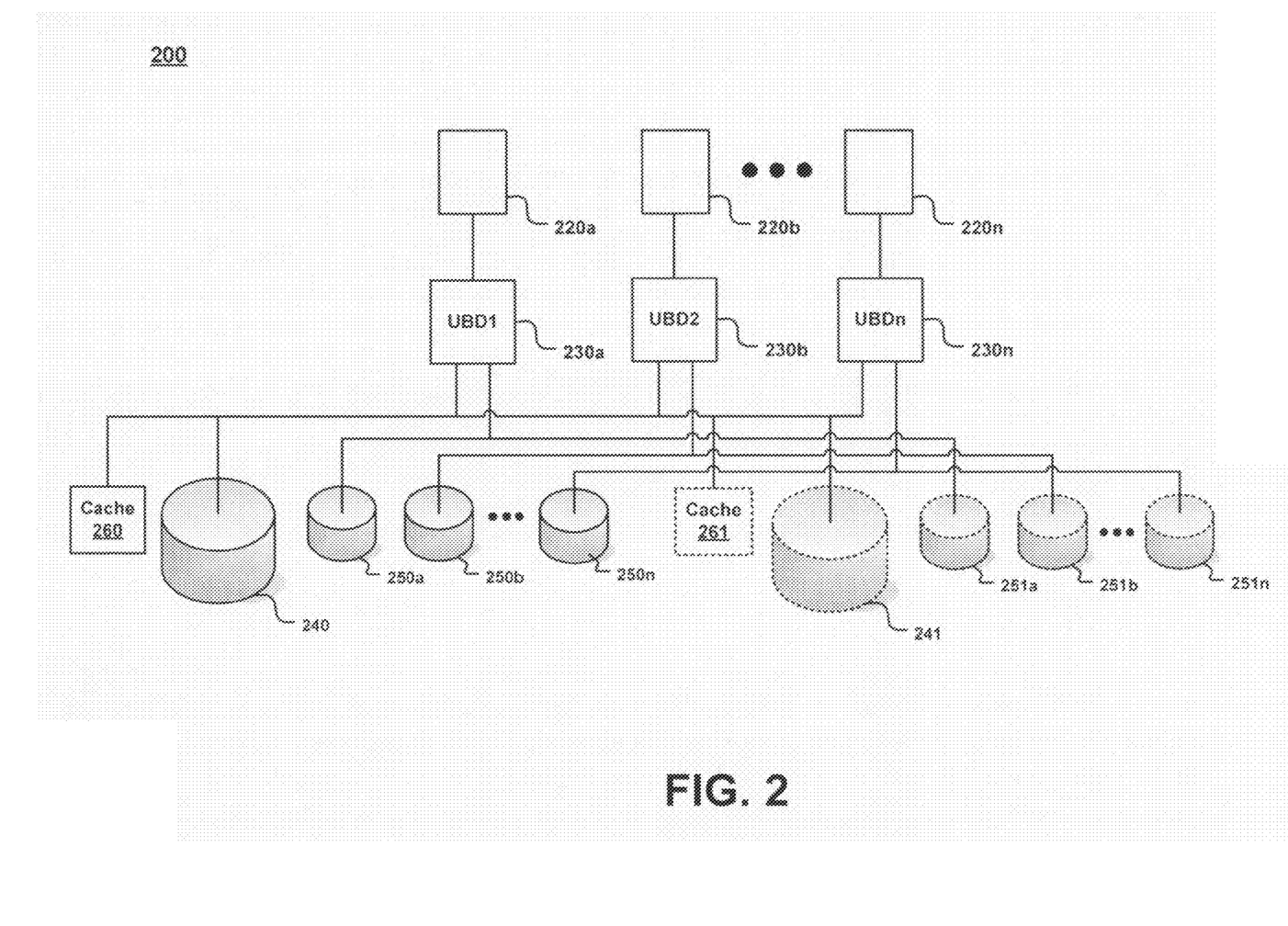
FIG. 2 is a diagram of a system, for root image caching and indexing in a block-level distributed application environment, in accordance with various embodiments of the present disclosure.

FIG. 2 is a diagram of a system 200 for root image caching and indexing in a block-level distributed application environment, in accordance with various embodiments of the present disclosure. In one embodiment, system 200 is implemented in a multi-computer system, such as an HPC cluster. In one embodiment, the application environment includes an operating system. In other embodiments, the application environment may contain other applications. System 200 has a number of compute nodes 220a-n coupled to first storage unit 240 and a corresponding second storage unit 250a-n though a corresponding union block device (UBD) 230a-n. To the compute nodes 220a-n, it appears that they have access to their own version of a distributed application environment. However, a separate and complete boot image is not created and stored for each compute node 220a-n.

System 200 has a first storage unit 240 for storing blocks of a root image of an application environment. The root image contains data initially common to the compute nodes 220a-n. The root image is not changed by compute nodes 220a-n. For example, in one embodiment, compute nodes 220a-n have read-only access to the first storage unit 240.

Moreover, each compute node 220a-n has a corresponding second storage unit 250a-n for storing a leaf image. The first storage unit 240 and second storage units 250a-n may each be contained on separate physical storage devices, on separate logical spaces on the same storage device, or any combination thereof. Regardless, the first storage unit 240 and the second storage units 250a-n may be contained within a single storage appliance. The leaf image may contain blocks of new data, blocks of changed data, or other blocks of data unique to the individual compute node. The leaf image may also contain a block modification log. In other words, a leaf image will describe the changes made by the respective compute node 220a-n to its instance of the application environment. Thus, when a compute node (e.g., node 220a) makes changes involving the root image, modifications are made to that compute node's leaf image (e.g., leaf image stored on second storage device 250a). With respect to changes to the root image, only the specific blocks that are changed are stored in the leaf image. For example, a particular file on the root image may comprise twenty blocks of data (e.g., blocks 1-20). One compute node (e.g., compute node 220a) desires to make a change to this file which involves a modification of only a few specific blocks of the file (e.g., blocks 4-9). In this example, only the modified blocks (e.g., blocks 4-9) will be stored in the compute node's leaf image (e.g., leaf image stored on second storage device 250a) plus some small overhead.

A compute node 220a-n mounts its instantiation of the application environment via its respective UBD 230a-n. In one embodiment, UBDs 230a-n are effectively low-level drivers that operate as an interface between the first and second storage devices and the file system of each compute node 220a-n. The file system may reside on the server side of the system 200. The file system may also reside on each of the compute nodes 220a-n. Because UBDs 230a-n operate below the file system, they are concerned merely with the blocks of data themselves, rather than files they form. As a result, system 200 is completely file system, and thus operating system, independent.

UBDs 230a-n determine what leaf image (from the appropriate second storage unit 250) is needed for portions of the application environment that their respective compute nodes 220a-n have changed. UBDs 230a-n also locate the portions of the application environment that are not changed by their respective compute nodes 220a-n. These portions may reside in the root image. There may also be intermediate images (not depicted in FIG. 2) comprising versions of the root image from which a compute node's instance of the application environment is derived. Further, UBDs 230a-n create a new leaf image on a respective second storage unit 250a-n when their respective compute nodes 220a-n make changes to their instantiations of the application environment. In one embodiment, the UBDs 230a-n obtain the information necessary to create the application environment from a block modification log located in its respective leaf image.

UBDs 230a-n may also modify the leaf image in response to their respective compute node's access to its instance of the application environment. For example, upon receiving a write request from their respective compute nodes for a sector X, the UBDs 230a-n will create an appropriate persistent mapping for sector X and then write sector X onto their respective second storage units 250a-n, where sector X can then be modified. It will be appreciated that the data block being modified may already exist in the leaf image, in which case it does not need to be mapped and copied from the root image before modification.

By providing an application environment to multiple compute nodes via a branching store system, embodiments allow for a more streamlined update/patch procedure. In one embodiment, first storage device 240 may be refreshed with a new operating system patch, thereby automatically refreshing the image for all dependent compute nodes.

Caching

An embodiment of the present disclosure provides for caching of portions of the root image. Because several compute nodes in a cluster may often access the same data (e.g., same drivers, same library files, etc.) on the root image, tremendous speed improvements can be realized by caching such data in cache 260. For example, by current standards, it is common for a storage disk to achieve a data transfer rate around 76 MB/s, whereas cache memory can achieve speeds up to and greater than 800 MB/s. In one embodiment, the cache may be contained within a single storage appliance, along with the first storage unit 240 and the second storage units 250a-n.

The value of such caching becomes even more apparent in the context of initial boot sequences. For example, a cluster of 20 compute nodes may be booted for the first time. Since it is a first boot, the cache is empty. The first compute node to boot (e.g., compute node 220a) will therefore load its data directly from the pertinent disks (e.g., first storage unit 240 and second storage unit 250a). While the first compute node is loading its data, its reads are intercepted and cached on a per-block basis in cache 260. Thereafter, when a second compute node (e.g., compute node 220b) goes to boot, any data required by the second compute node that was previously accessed by the first compute node can be served out of the cache 260 rather than the first storage unit. It is appreciated that to the extent that the configurations of the first and second compute nodes are substantially the same, the relationship between the data requested by the second compute node and the data stored in the cache 260 approaches a 1:1 ratio (i.e., a greater than ten-fold improvement in root image access time is realized).

It is further appreciated that the entire contents of the root image may not necessarily be accessed to achieve a boot (e.g., unused drives and the like). Therefore, the data capacity of cache 260 can be much less than that of the first storage unit 240.

As new data is accessed on the root image that is not currently stored in the cache 260, the cache 260 may thereafter be updated with the new data. Moreover, as the amount of data in the cache 260 approaches or exceeds a threshold value, certain data will need to be removed from the cache 260 to make way for the new data. The data to be removed, deleted, overwritten, etc., may be selected the basis of, for example, how recently the data was accessed, how frequently the data has been accessed, or a combination of both. It should be appreciated that other cache arbitration algorithms known in the art may similarly be used.

Indexing

An embodiment of the present disclosure provides for indexing the root image. From the standpoint of seek time, it is beneficial for each compute node to have access to an index of its file system. In a traditional clustered computing situation, each compute node would independently index its file system. To the extent that each compute node in a cluster has similar operating environments to the others, indexing performed on common data is therefore redundant.

As an added benefit of the architecture 200 depicted in FIG. 2, because the data stored in the root image is by definition common to all the compute nodes 220*a-n*, one compute node (e.g., compute node 220*a*) can index the contents of the root image and then provide the indexing results to the other compute nodes (e.g., compute nodes 220*b-n*). Thereafter, the compute nodes 220*a-n* need only be concerned with indexing their respective leaf image, which are relatively small compared to the root image. Moreover, in embodiments where the first storage unit 240 is read-only, the root image will not have to be re-indexed because the contents of the root image do not change. It is appreciated that the indexing results can be provided to the other compute nodes in a number of ways. For example, the results may be stored on a shared storage unit (such as, but not limited to, cache 260), the results may provided directly to the other compute nodes, etc. Moreover, the initial indexing of the root image does not have to be performed by a compute node. For example, the indexing may be performed by a dedicated indexing host.

Example Methods

Figure 3A:
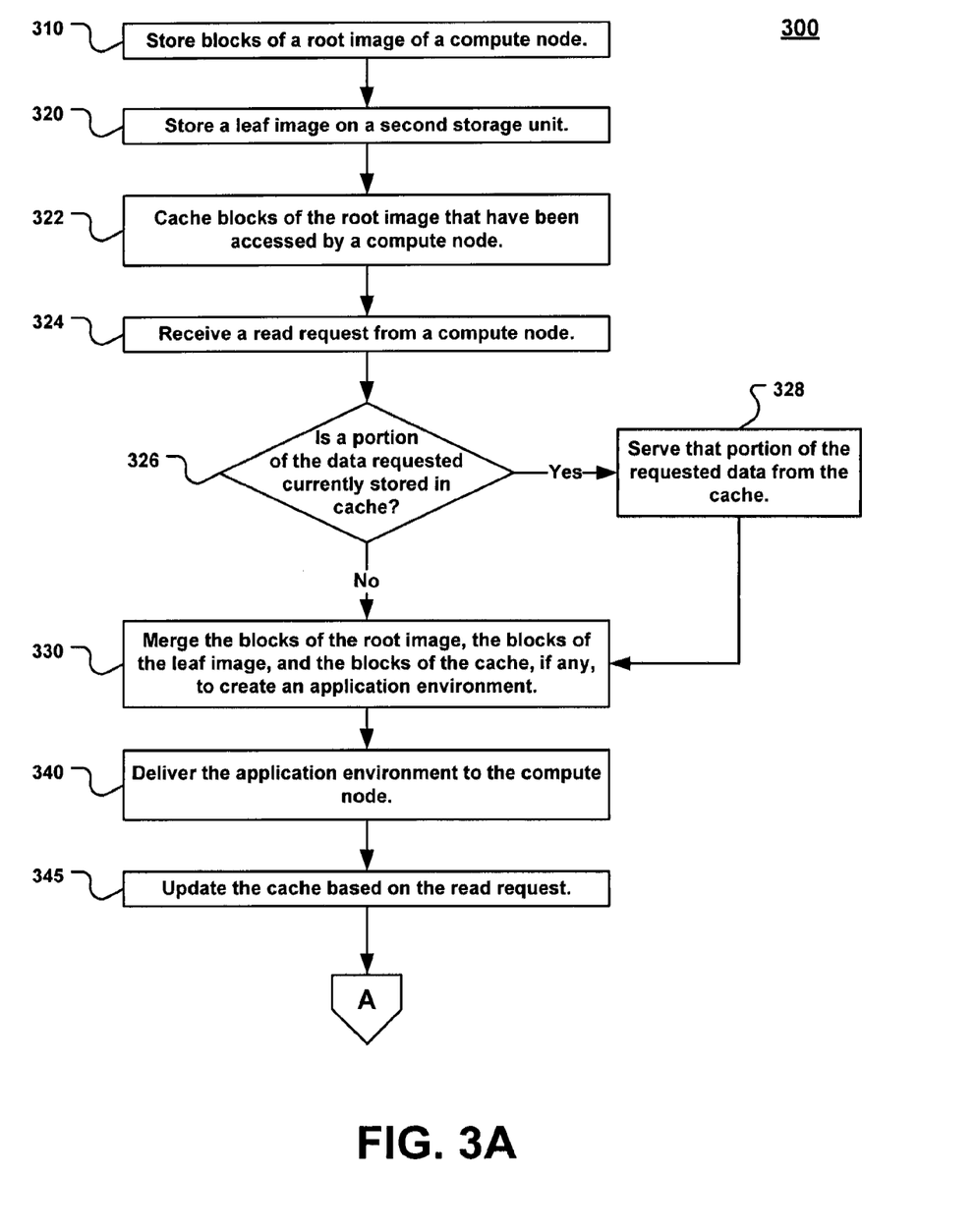
FIGS. 3A-3B are flowcharts illustrating a process for root image caching and indexing in a block-level distributed application environment, in accordance with various embodiments of the present disclosure.
Figure 3B:
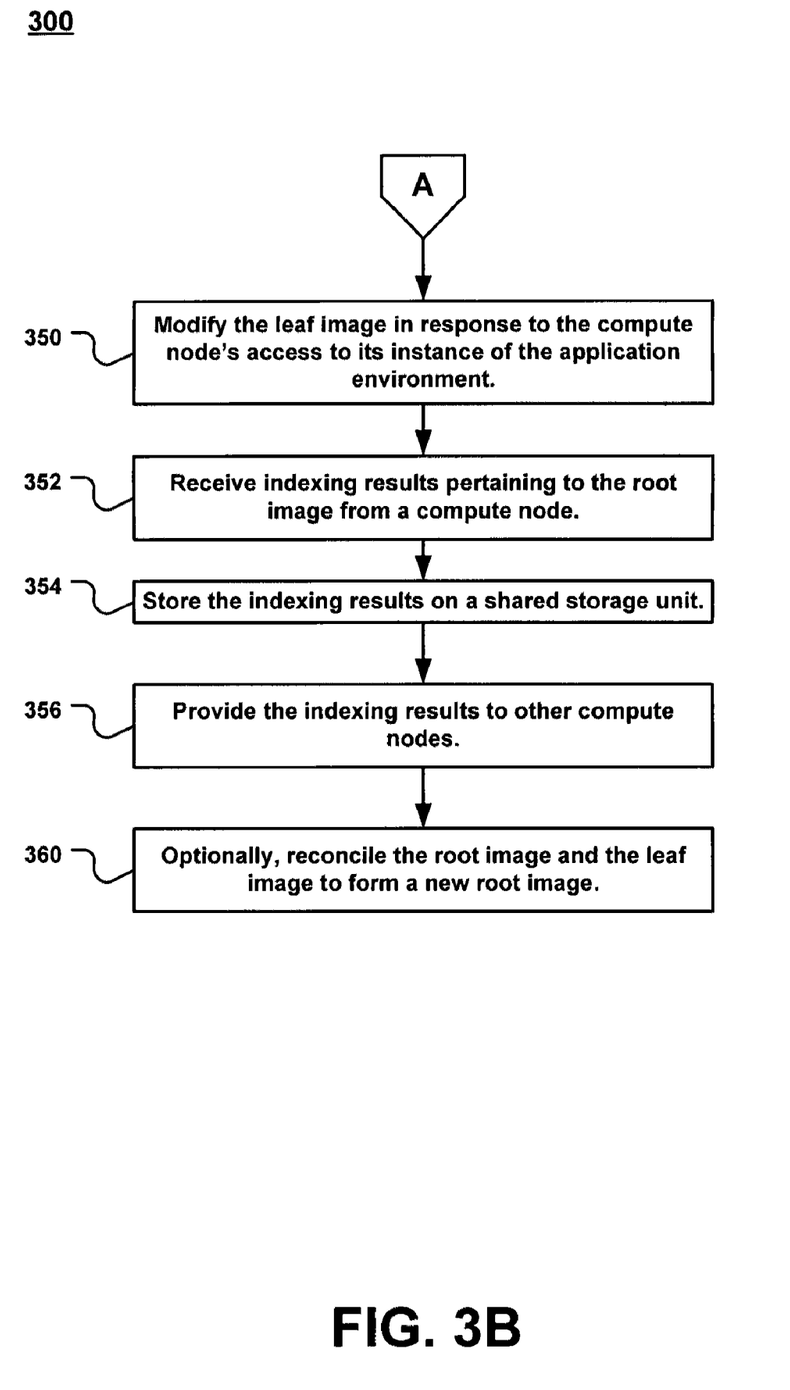

FIGS. 3A-3B are flowcharts illustrating a process 300 for root image caching and indexing in a block-level distributed application environment, in accordance with various embodiments of the present disclosure. Although specific operations are disclosed in process 300, such operations are exemplary. Process 300 may not include all of the operations illustrated by FIGS. 3A-3B. Also, process 300 may include various other operations and/or variations of the operations shown by FIGS. 3A-3B. Likewise, the sequence of the operations of process 300 can be modified. Steps of process 306 may be stored as instructions on a computer readable medium and executed on a computer processor.

Step 310 involves storing blocks of a root image of the compute node on a first storage unit. By storing data at the block level, embodiments are able to operate beneath the file system and thus are designed to be file system and operating system independent.

Step 320 involves storing a leaf image on a second storage unit. The leaf image includes, but is not limited to, new data blocks for the compute node and blocks of the root image that the compute node has changed. The leaf image includes a block modification log in one embodiment.

Step 322 involves caching blocks of the root image that have been accessed by a compute node. In doing so, embodiments improve the access time for subsequent compute nodes requesting to access the same blocks of data.

Step 324 involves receiving a read request from a compute node. At step 326, a determination is made as to whether the data requested by the compute node is currently stored in the cache. If a portion of the data is currently stored in the cache, that portion is then served from the cache (step 328), thus improving the access time with respect to that portion of data as compared to otherwise retrieving it from a storage unit such as a hard disk.

Step 330 involves merging the blocks of the root image, the blocks of the leaf image, and the relevant blocks of the cache, if any, to create the application environment. In other words, the merging occurs at an operational level between the file system of a compute node and the first storage unit, the corresponding second storage unit, and the cache. Once the application environment has been created, it will appear to the compute node as one cohesive image rather than a base image plus its additions, deletions, and modifications. To the compute node, it appears that it has access to its own unique version of an application environment. However, a separate and complete boot image is not actually stored for the compute node.

Step 340 involves delivering the application environment to the compute node. Step 340 may comprise a low-level driver determining which data blocks are needed for the compute node's instance of the application environment and delivering the application environment to the compute via the compute node's file system.

Step 345 involves updating the cache based on the read request. For instance, to the extent that a compute node has accessed root image data not currently stored in the cache, the cache should be updated to include that cache. In some cases, the amount of data in the cache may approach a capacity limit, either due to the physical capacity of the cache itself or due to threshold limit set in software.

Figure 4:
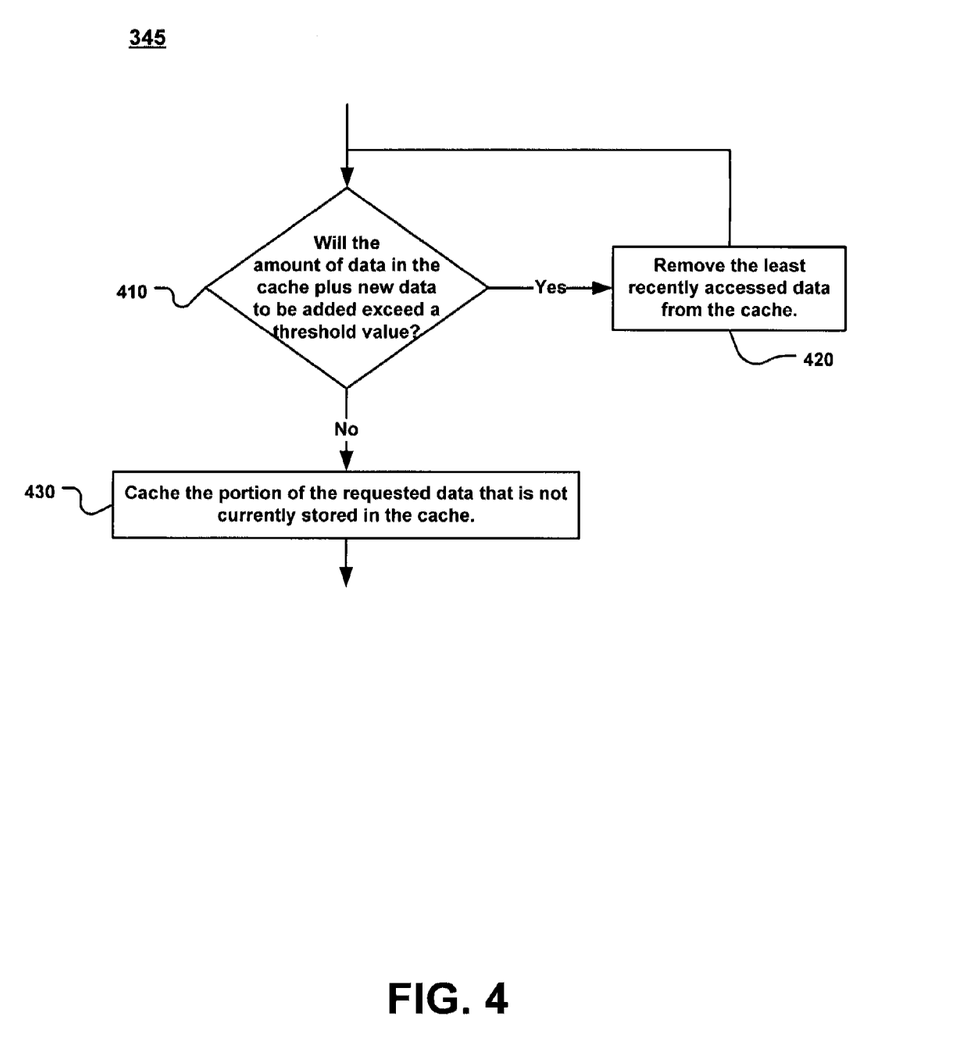
FIG. 4 illustrates a flowchart for a process for updating the cache based on a read request, in accordance with an embodiment of the present disclosure.

FIG. 4 illustrates a flowchart for a process 345 for updating the cache based on a read request, in accordance with an embodiment of the present disclosure. It should be appreciated that the steps illustrated in FIG. 4 are exemplary and the updating performed in block 345 of process 300 may be achieved in many other ways as well. Process 345 may not include all of the operations illustrated by FIG. 4. Also, process 345 may include various other operations and/or variations of the operations shown by FIG. 4. Likewise, the sequence of the operations of process 345 can be modified. Steps of process 345 may be stored as instructions on a computer, readable medium and executed on a computer processor.

At step 410, a determination is made as to whether the amount of data currently in the cache plus new data to be added exceeds a threshold value (physical or software-imposed). If the threshold value will be exceeded, the least recently accessed data is removed from the cache (step 420). This sequence repeats until there is adequate headroom in the cache to accommodate the new data. Once it is determined that the amount of data currently in the cache plus the new data to be added will not exceed the threshold value, FIG. 4 proceeds to step 430. Step 430 involves caching the portion of the requested data that is not currently stored in the cache (i.e., the "new data").

With reference again to FIG. 3B, step 350 involves modifying the leaf image in response to the compute node's access to its instance of the application environment. The modifying of the leaf image may include copying one or more data blocks from the root image to the leaf image, and modifying the data block in the leaf image. It will be appreciated that the data block being modified may already exist in the leaf image, in which case it does not need to be copied from the root image before modification.

Step 352 involves receiving indexing results pertaining to the root image from a compute node. Step 356 involves providing the indexing results to other compute nodes. It is appreciated that this may be done in a number of ways. For example, the indexing results may be provided directly to the compute nodes. Alternatively, the indexing results may be stored on a shared storage unit (step 354) and then provided to the compute nodes via the shared storage unit. By receiving the indexing result of the root image from one compute node and providing it to the rest of the compute nodes, valuable time, resources, and bandwidth are saved for the other compute nodes. Since the root image is common to all the compute nodes, any re-indexing of the root image would be redundant and a waste of resources.

Step 360 involves reconciling the root image and the leaf image to form a new root image. This may be desirable if, for example, the leaf image has grown to exceed a particular disk quota. Furthermore, if there are multiple compute nodes that access the root image, each having their own respective leaf image, and there is substantial commonality between the leaf images, it may also be beneficial to reconcile the leaf images with the root image.

Figure 5:
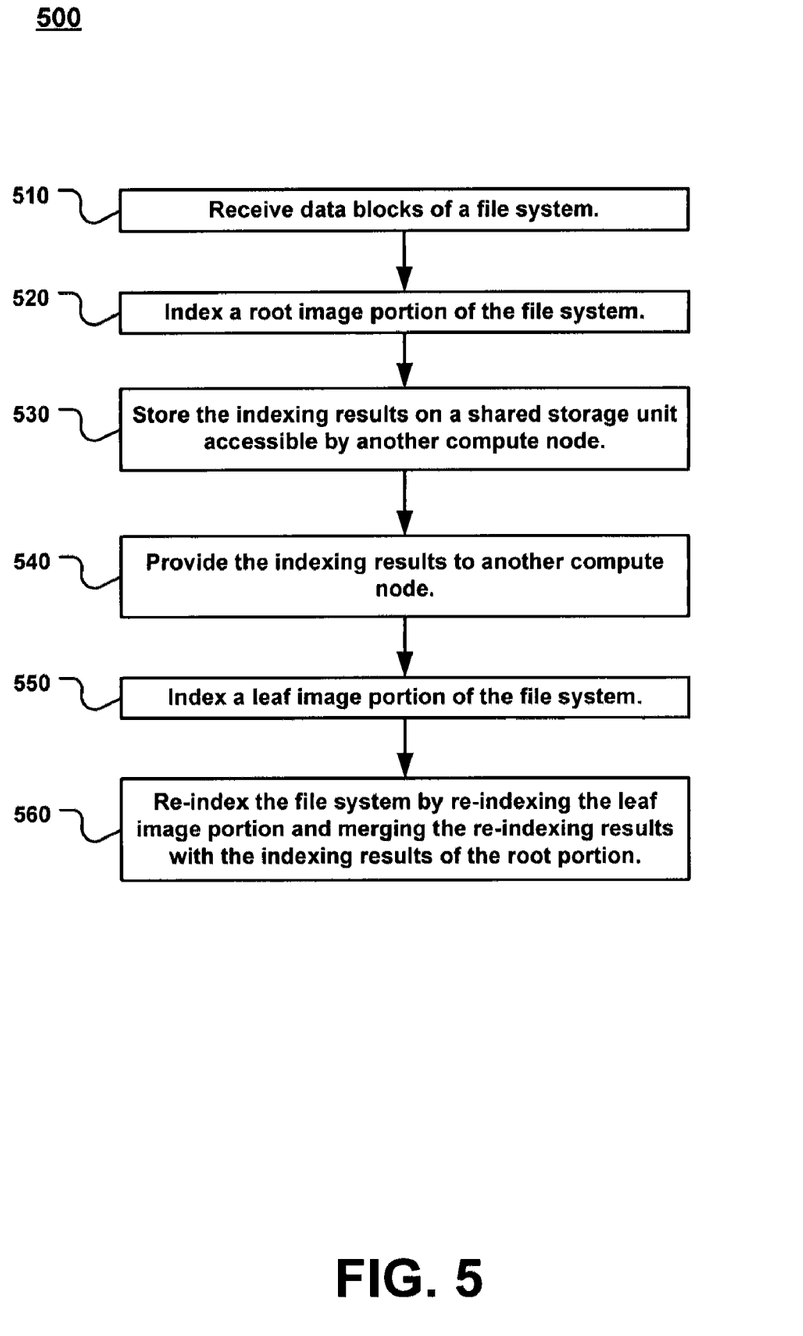
FIG. 5 illustrates a flowchart for a process for indexing a root image, in accordance with various embodiments of the present disclosure.

FIG. 5 illustrates a flowchart for a process 500 for indexing a root image, in accordance with various embodiments of the present disclosure. Although specific operations are disclosed in process 500, such operations are exemplary. Process 500 may not include all of the operations illustrated by FIG. 5. Also, process 500 may include various other operations and/or variations of the operations shown by FIG. 5. Likewise, the sequence of the operations of process 500 can be modified. Steps of process 500 may be stored as instructions on a computer readable medium and executed on a computer processor.

Step 510 involves receiving data blocks of a file system at a compute node. The data blocks include a root image portion in the leaf image portion. As described above, the leaf image portion includes additional data blocks not previously contained in the root image portion and also changes made by the compute node to the blocks of the root image. Thus, the file system actually seen by the compute node is a product of merging the root image portion in the leaf image portion together at the block level.

Step 520 involves the compute node indexing the root image portion of its file system. In such a case, the compute node is to some extent agnostic to the fact that its file system is divided between a root image portion and a leaf image portion. At step 540, the compute node provides the indexing results of the root image portion to another compute node. It is appreciated that this may be achieved a number of ways. For example, the first compute node may simply provide the indexing results to the second compute node directly. Alternatively, the first compute node may store the indexing results on a shared storage unit that is accessible by the second compute node (step 530).

Thereafter, the compute node may complete its indexing of its file system by indexing the leaf image portion of the file system (step 550). Further down the road, the benefits of indexing the root image separately from the leaf image are realized when the compute node requires that its file system be re-indexed. At step 560, the compute node re-indexes its file system by re-indexing its corresponding leaf image portion with the previous indexing results of the root portion.

Thus, by operating at the block level, embodiments of the present disclosure provide file system and operating system independent systems and methods for distributing an application environment to a compute node. By utilizing a branching store system of application environment distribution, embodiments of the present disclosure allow creation of boot images on the fly without significantly diminishing bring-up time. This is due to the fact that creating a new boot image does not require copying the contents of the root image, but rather it involves registering a new UBD with the system, which occurs very quickly. Bring up time, and access time in general, can be further improved by caching commonly accessed the portions of the root image. Moreover, updating the boot image for the entire cluster simply involves updating the root image.

Embodiments of the present disclosure also allow for scalability and redundancy. For example, a server containing the root image may only have the resources to supply the root image to 100 compute nodes. Thus; in order to implement a 200-compute node system, two servers, each containing a copy of the root image, are used. This scalability provided by embodiments also lends itself to dynamic scaling. In other words, the number of root images required for a specific configuration can change based on the I/O workload, and new root images can be created on the fly accordingly. Moreover, additional servers containing the root image may be added into the system to provide redundancy and increase reliability. For example, and with reference to FIG. 2, cache 261, first storage unit 241, and second storage units 251$a$-$n$ provide failover/redundancy security for system 200. As an added security measure, some of the root nodes may be located remotely from each other (e.g., half located in a main office and half in a satellite office). In addition, it is possible to copy the contents of one or more leaf nodes into a non-UBD (regular block device) copy (e.g., for use as an isolated backup).

Moreover, because of the commonality of the root image and the fact that its contents are not directly changed, certain operations performed on the root image (e.g., indexing) only need to be performed once by one compute node. Thereafter, the results of that operation can be shared with the other compute nodes in the cluster, thus saving the other compute nodes valuable time and resources.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for providing data to a plurality of compute nodes, the system comprising:
   a first storage unit configured to store blocks of a root image of said compute nodes;
   a plurality of second storage units configured to store leaf images of respective compute nodes, said leaf images including only additional data blocks not previously contained in said root image and changes made by respective compute nodes to the blocks of said root image, wherein said leaf images of respective compute nodes do not include blocks of said root image that are unchanged by respective compute nodes; and a cache configured to cache blocks of said root image previously accessed by at least one of said compute nodes.

2. The system as recited in claim 1 wherein said cache is configured to store X most recently accessed blocks of said root image, and wherein X represents a cache threshold value.

3. The system as recited in claim 1 wherein said first storage unit, said second storage units, and said cache are contained within a single storage appliance.

4. The system as recited in claim 1 further comprising:
a plurality of union block devices configured to interface between respective compute nodes and said first storage unit, respective second storage units, and said cache to distribute application environments to the compute nodes, wherein said union block devices are configured to create said application environments by merging the blocks of said root image with the blocks of respective leaf images.

5. The system as recited in claim 4 wherein said union block devices comprise low-level drivers for interfacing between the file systems of respective compute nodes and said first storage unit, respective second storage units, and said cache.

6. The system as recited in claim 1 wherein said first storage unit is read-only.

7. A method for providing data to a plurality of compute nodes, comprising:
storing blocks of a root image of said compute nodes on a first storage unit;
storing leaf images for respective compute nodes on respective second storage units, said leaf images including only additional data blocks not previously contained in said root image and changes made by respective compute nodes to the blocks of the root image, wherein said leaf images of respective compute nodes do not include blocks of said root image that are unchanged by respective compute nodes; and
caching blocks of said root image that have been accessed by at least one of said compute nodes in a cache memory.

8. The method as recited in claim 7 further comprising:
receiving a read request from at least one of said compute nodes, wherein a first portion of the data requested is currently stored in said cache memory; and
providing said first portion of said data to said at least one of said compute nodes from said cache memory.

9. The method as recited in claim 8 further comprising:
updating said cache memory based on said read request.

10. The method as recited in claim 9 wherein a second portion of the data requested is not currently stored in said cache memory and said updating comprises:
caching said second portion in said cache memory; and
removing the least recently accessed data from said cache memory if the amount of data in said cache memory is above a threshold value.

11. The method as recited in claim 7 further comprising:
merging the blocks of said root image with the blocks of respective leaf images to create cohesive respective application environments.

12. The method as recited in claim 11 wherein said merging occurs at an operational level between file systems of the respective compute nodes and said first storage unit, respective second storage units, and said cache memory.

13. The method as recited in claim 7 wherein said first storage unit is read-only.

14. A system for indexing file systems for a plurality of compute nodes, the system comprising:

a first storage unit configured to store blocks of a root image of said compute nodes;
a plurality of second storage units configured to store leaf images of respective compute nodes, said leaf images comprising only additional data blocks not previously contained in said root image and changes made by respective compute nodes to the blocks of said root image, wherein said leaf images of respective compute nodes do not include blocks of said root image that are unchanged by respective compute nodes; and
a plurality of union block devices corresponding to said compute nodes, said union block devices configured to interface between said compute nodes and said first and second storage units to distribute said file systems to said compute nodes, wherein said union block devices are configured to create said file systems by merging the blocks of said root image stored on the first storage unit with the blocks of respective leaf images stored on respective second storage units, and wherein further at least one of said compute nodes is configured to index said root image and provide the indexing results to another of said compute nodes.

15. The system as recited in claim 14 wherein said first storage unit and said second storage units are contained within a single storage appliance.

16. The system as recited in claim 14 further comprising:
a plurality of union block devices configured to interface between respective compute nodes and said first storage unit and respective second storage units, said union block devices configured to distribute application environments to the compute nodes, wherein said union block devices are configured to create said application environments by merging the blocks of said root image with the blocks of respective leaf images.

17. The system as recited in claim 16 wherein said union block devices comprise low-level drivers for interfacing between the file systems of respective compute nodes and said first storage unit, respective second storage units, and said cache.

18. The system as recited in claim 14 wherein said first storage unit is read-only.

19. A method for indexing file systems for a plurality of compute nodes, comprising:
storing blocks of a root image of said compute nodes on a first storage unit;
storing leaf images for respective compute nodes on respective second storage units, said leaf images comprising only additional data blocks not previously contained in said root image and changes made by respective compute nodes to the blocks of the root image, wherein said leaf images for respective compute nodes do not include blocks of said root image that are unchanged by respective compute nodes;
merging the blocks of said root image with the blocks of respective leaf images stored on respective second storage units to create respective file systems for respective compute nodes;
receiving indexing results pertaining to said root image from one of said compute nodes; and
providing said indexing results to the others of said compute nodes.

20. The method as recited in claim 19 further comprising: storing said indexing results on a shared storage unit.

21. The method as recited in claim 19 wherein said merging occurs at an operational level between respective file systems of the compute nodes and said first storage unit and respective second storage units.

22. The method as recited in claim 19 wherein said first storage unit is read-only.

23. A computer-readable storage medium having instructions stored thereon that, in response to execution by at least one computing device, cause the at least one computing device to:
- receive data blocks of a file system, said data blocks comprising a root image portion and leaf image portion, said leaf image portion comprising only additional data blocks not previously contained in said root image portion and, changes made by said first compute node to the blocks of said root image, wherein said leaf image portion does not include blocks of said root image that are unchanged by said first compute node, wherein said file system is the result of merging said root image portion and said leaf image portion together at the block-level;
- index said root image portion; and
- provide the results of said indexing to a second compute node, wherein said logic encoded in the one or more tangible media comprise computer executable instructions executed by the first compute node.

24. The computer-readable storage medium of claim 23, wherein the instructions further cause the at least one computing device to store said results of said indexing on a shared storage unit accessible by said second compute node.

25. The computer-readable storage medium of claim 23, wherein the instructions further cause the at least one computing device to index said leaf image portion.

26. The computer-readable storage medium of claim 25, wherein the instructions further cause the at least one computing device to re-index said file system by re-indexing said leaf image portion and merging the results of said re-indexing of said leaf image portion with said results of said indexing of said root image portion.

27. The computer-readable storage medium of claim 23 wherein said root image portion is read-only.

* * * * *

UNITED STATES PATENT AND TRADEMARK OFFICE
CERTIFICATE OF CORRECTION

| | | |
|---|---|---|
| PATENT NO. | : 8,332,844 B1 | Page 1 of 1 |
| APPLICATION NO. | : 11/709477 | |
| DATED | : December 11, 2012 | |
| INVENTOR(S) | : Kulkarni et al. | |

It is certified that error appears in the above-identified patent and that said Letters Patent is hereby corrected as shown below:

On Title Page 2, item (56), under "OTHER PUBLICATIONS", in Column 2, Lines 28-30, delete "OpenMP Fortan..............34-36.".

In the Specifications:

In Column 3, Line 8, delete "system," and insert -- system --, therefor.

In Column 3, Line 54, delete "Magnetic" and insert -- magnetic --, therefor.

In Column 7, Line 55, delete "306" and insert -- 300 --, therefor.

In Column 8, Line 50, delete "computer, readable" and insert -- computer readable --, therefor.

In the Claims:

In Column 13, Line 11, in Claim 23, delete "and," and insert -- and --, therefor.

Signed and Sealed this
Eleventh Day of June, 2013

Teresa Stanek Rea
*Acting Director of the United States Patent and Trademark Office*